(12) United States Patent
Gabrielle et al.

(10) Patent No.: US 11,788,913 B2
(45) Date of Patent: Oct. 17, 2023

(54) PRESSURE SENSOR FOR FLUID CIRCUIT OR BATTERY PACK FOR A MOTOR VEHICLE

(71) Applicant: Hutchinson, Paris (FR)

(72) Inventors: Brice Gabrielle, Montargis (FR); Thierry Benard, Checy (FR)

(73) Assignee: HUTCHINSON, Paris (FR)

( * ) Notice: Subject to any disclaimer, the term of this patent is extended or adjusted under 35 U.S.C. 154(b) by 0 days.

(21) Appl. No.: 17/716,260

(22) Filed: Apr. 8, 2022

(65) Prior Publication Data
US 2022/0326104 A1 Oct. 13, 2022

(30) Foreign Application Priority Data
Apr. 9, 2021 (FR) ...................................... 2103622

(51) Int. Cl.
*G01L 9/00* (2006.01)
*G01F 1/64* (2006.01)
(52) U.S. Cl.
CPC .............. *G01L 9/0095* (2013.01); *G01F 1/64* (2013.01); *G01L 9/0072* (2013.01)
(58) Field of Classification Search
None
See application file for complete search history.

(56) References Cited

U.S. PATENT DOCUMENTS

| 7,146,861 | B1 * | 12/2006 | Cook | ...................... G01L 9/008 73/753 |
| 2006/0144155 | A1 * | 7/2006 | Liu | .......................... G01L 9/007 73/753 |
| 2014/0309577 | A1 * | 10/2014 | Thomas | ..................... G01F 1/64 604/9 |

FOREIGN PATENT DOCUMENTS

DE 103 23 297 A1 12/2003

OTHER PUBLICATIONS

Jose G Villalobos and Al: "IDC based battery-free wireless pressure sensor", 2010 IEEE/ASME International Conference on Mechatronic and Embedded Systems and Applications (MESA 2010) IEEE Piscataway, NJ, USA,IEEE, Piscataway, NJ, USA, Jul. 15, 2010 (Jul. 15, 2010), pages (Year: 2010).*

* cited by examiner

*Primary Examiner* — Brandi N Hopkins
*Assistant Examiner* — Nigel H Plumb
(74) *Attorney, Agent, or Firm* — BROWDY AND NEIMARK, P.L.L.C.

(57) ABSTRACT

A pressure sensor (10) for a fluid circuit, in particular, of a motor vehicle, the sensor comprising a body (12) comprising a fluid inlet (14), a fluid outlet (16) and an internal chamber (18) for connecting the inlet to the fluid outlet for the fluid flow in said body, the sensor further comprising an elastically deformable membrane (20) located in said chamber and comprising a first face (20a) intended to be in contact with the fluid flowing in the body, wherein the sensor further comprises a resonant circuit (22) of the RLC type located in said chamber and associated with a readout circuit (23) located outside the chamber (18).

19 Claims, 7 Drawing Sheets

PRESSURE SENSOR FOR FLUID CIRCUIT OR BATTERY PACK FOR A MOTOR VEHICLE

TECHNICAL FIELD OF THE INVENTION

The present invention relates, in particular, to a pressure sensor for a fluid circuit or a sealed enclosure, in particular of a motor vehicle.

TECHNICAL BACKGROUND

The technical background includes, in particular, the documents US-A1-2006/144155, US-B1-7,146,861 and US-A1-2014/309577.

A vehicle, in particular an automobile, comprises several fluid circuits whose pressure must be measured and controlled in order to check in real time the correct operation of the vehicle. This is, for example, the case of a vehicle's fuel system.

A vehicle, in particular electric or hybrid, may further comprise a battery pack which comprises a sealed enclosure in which electrical battery cells are housed. This battery pack may be equipped with a pressure sensor in order to detect a rise in pressure inside the enclosure, in particular due to a release of gas from a malfunctioning cell.

There are several pressure sensor technologies. Some pressure sensors include, for example, a strain gauge located on a membrane in contact with a fluid. As the pressure of the fluid changes, the membrane deforms and the measurement of the change in the resistivity of the gauge can be related to the pressure of the fluid. This measurement principle is widely used but requires wires to be present to read the changing properties of the gauge.

Other sensors include an electrical piezo material. However, here too, two wires are required to measure the voltage generated by the pressure on the piezoelectric material.

Other sensors use MEMS (micro-electro-mechanical systems) technology and thus semiconductor materials.

The present invention provides a wireless pressure sensor technology, particularly useful for measurements in hazardous or isolated environments such as a fuel system or a sealed enclosure such as a battery pack or the like in a motor vehicle.

SUMMARY OF THE INVENTION

The present invention relates to a pressure sensor for a fluid circuit or sealed enclosure, the sensor comprising:
 an elastically deformable membrane comprising two opposite faces, a first face of which is intended to be in contact with a fluid,
 a resonant circuit of the RLC type comprising a capacitor which is located on one of the two faces of the membrane and whose capacitance varies as a function of the amplitude of elastic deformation of said membrane, and a first coil which is connected to said capacitor, said resonant circuit being configured so as to have a resonant frequency which varies as a function of the capacitance of the capacitor and therefore of the elastic deformation of the membrane, and
 a readout circuit offset from the membrane and comprising a second coil located opposite the first coil and configured to detect the resonant frequency of said resonant circuit and to emit a readout signal accordingly, characterised in that the capacitor comprises two electrodes which are connected respectively to the terminals of said first coil and which are both located on the face of the membrane so that they both follow the elastic deformation of the membrane, and in that said first coil is located on or above that face of the membrane.

It is thus understood that the cooperation between the resonant and readout circuits is achieved without wires. In other words, the resonant circuit is not connected by wires, which is advantageous and facilitates the manufacture and maintenance of the sensor. The readout circuit can be connected by wires to other electronic equipment and in particular to an on-board computer of the vehicle.

It is also understood that the capacitor takes up little space because its two electrodes are located on the membrane and do not occupy a large space above the membrane. The two electrodes follow the deformations of the membrane and are therefore advantageously flexible and for example in the form of films or thin layers. The arrangement of the first coil on or above the membrane also optimises the space requirement of the sensor.

The pressure sensor according to the invention may comprise one or more of the following features, taken in isolation from each other or in combination with each other:
 the membrane has a generally planar, and for example disc, shape;
 the capacitor comprises a sandwich structure located on said face of the membrane and comprising two stretchable electroconductive layers separated by a dielectric layer, these electroconductive layers forming electrodes and being connected respectively to the terminals of said first coil;
 the capacitor comprises two planar and stretchable electrodes located on said second face of the membrane and interleaved with each other, these electrodes being connected respectively to the terminals of said first coil;
 the first and second coils have outer diameters less than or equal to the outer diameter or a maximum transverse dimension of the membrane;
 the sensor comprises a body in which the membrane is mounted;
 the body comprises an outer annular or peripheral fastening flange, this flange extending around said membrane and comprising orifices for the passage of fastening elements;
 the body comprises a one-piece casing comprising a central part defining said chamber, and two extensions forming said inlet and outlet respectively;
 the central part of the casing has a generally cylindrical shape and said extensions are diametrically opposed with respect to an axis of the central part;
 the body further comprises a lid attached and fixed to the central part and defining with the membrane a space for housing said readout circuit;
 the membrane has its outer periphery clamped by the fastening flange or between the lid and the central part, so that this membrane provides a seal;
 the membrane comprises an annular or peripheral over thickness at its outer periphery;
 the second coil is located on the lid, or is carried by a cover located above the lid;
 the first and second coils comprise a common winding axis;
 said winding axis is coincident with an axis of the central part;
 the entirety of the resonant circuit is located on the face of the membrane, the capacitor of the resonant circuit being located on a central part of the membrane and the first coil being located on an annular or peripheral part of the membrane extending around the abovementioned central part;

the resonant circuit is located on the face of the membrane exposed to the fluid or on the opposite face of the membrane exposed to the fluid;

the central part of the membrane has a constant thickness E1 and the annular or peripheral part of the membrane has a constant thickness E2 which is greater than E1, and which is for example at least three times greater than E1 and at most ten times greater than E1;

the membrane further comprises an annular or peripheral bead at its outer periphery which is connected to the annular or peripheral part of the membrane by an annular or peripheral web of material of thickness E3, E3 being between E1 and E2;

the web is interposed between two coaxial cylindrical rims of the body;

the second coil is connected to an electronic control device which comprises a first module configured to adjust an impedance of the RLC circuit and a second module which is configured to analyse a vector frequency;

the first coil extends around an axis of the central part.

The present invention also relates to a fluid circuit, in particular, for a motor vehicle, comprising at least one sensor as described above.

The present invention also relates to a sealed enclosure such as a battery pack, in particular for a motor vehicle, comprising at least one sensor as described above.

The present invention also relates to a vehicle, in particular an automobile, comprising at least one sensor, a circuit, or a sealed enclosure as described above.

BRIEF DESCRIPTION OF THE FIGURES

Other characteristics and advantages of the invention will become apparent in the course of the detailed description which follows, for the understanding of which reference is made to the appended drawings in which.

DETAILED DESCRIPTION OF THE INVENTION

The invention relates to a pressure sensor intended to equip a fluid circuit or a sealed enclosure in particular of a motor vehicle. The fluid circuit is for example a fuel system. The sealed enclosure is for example a battery pack, i.e., a box containing electric battery cells. However, these applications of the sensor according to the invention are not limiting.

According to the first embodiments shown in FIGS. 1 to 11, the pressure sensor 10 is intended to equip a fluid circuit. The sensor 10 comprises a body 12, for example made of a plastic material, which comprises a fluid inlet 14, a fluid outlet 16 and an internal chamber 18 for connecting the inlet to the fluid outlet for the fluid flow in the body 12 from the inlet 14 to the outlet 16 (see arrows F).

The sensor 10 further comprises an elastically deformable membrane 20 which has a first face 20a intended to be in contact with the fluid flowing through the body 12.

In the present application, "membrane" means a substantially planar and elastically deformable element. This membrane is made of an elastically deformable material such as an elastomer, for example. As will be described in more detail in the following, the property and in particular the amplitude of elastic deformation of the membrane is used to be able to measure the pressure of the fluid circulating in the body.

The membrane 20 thus comprises a face 20a, here lower, in contact with the fluid, and also comprises a face 20b, here upper.

The membrane 20 separates the chamber 18, located for example under the membrane 20, from a space 19 located above the membrane 20.

The chamber 18 and the space 19 are preferably sealed off from each other, this seal being preferably ensured by the membrane 20 as will be described in the following.

During these deformations, the membrane 20 moves from a planar position to a curved position towards the inside of the chamber 18, in the case of a negative pressure in the fluid, and towards the inside of the space 19, in the case of an excess pressure in the fluid.

The pressure sensor 10 also comprises two electronic circuits, respectively resonant 22 and readout 23.

The resonant circuit 22 is housed in the space 19, and the readout circuit 23 is located outside in the space 19.

The resonant circuit 22 is of the RLC type, i.e., it is a circuit that can be considered as comprising in series a resistor 22a (letter R—see FIG. 3), an inductor or coil 22b (letter L) and a capacitor 22c or a capacitance (letter C).

In practice, the resonant circuit 22 comprises a capacitor 22c mounted on the terminals of a coil 22b, the resistance of the circuit 22 being formed by the self-resistance of the coil and capacitor.

The capacitor 22c of the resonant circuit 22 is located directly on the membrane 20 and in particular on its face 20b. The capacitor 22c is configured so that its capacitance varies according to the amplitude of elastic deformation of the membrane 20. Depending on the configuration of the capacitor 22c, the greater the amplitude of the deformation, the greater the capacitance of the capacitor may be, or conversely, the lower it can be.

According to the invention, the capacitor 22c comprises two electrodes which are respectively connected to the terminals of said first coil 22b and which are both located on the face 20b of the membrane 20 so that they can both follow the elastic deformations of the membrane.

The electrodes are advantageously flexible and therefore deformable. They may be in the form of films or layers.

Figure 1:
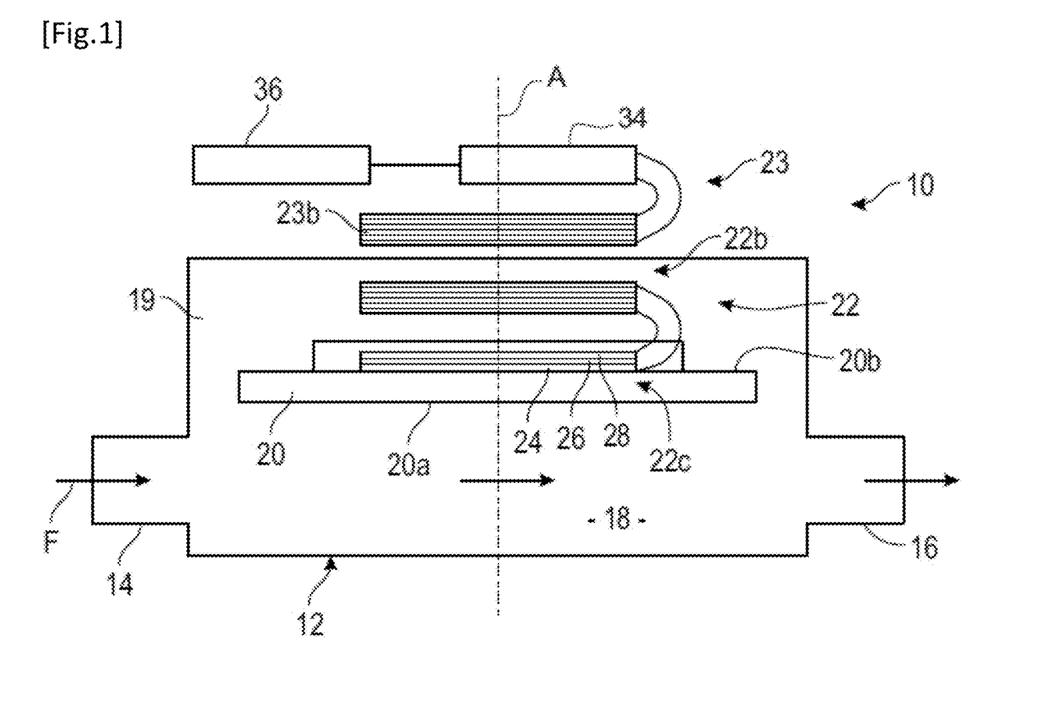
FIG. 1 is a very schematic view of a pressure sensor according to the invention.

According to a first configuration, the capacitor 22c comprises a sandwich structure visible in FIG. 1 which is located on the face 20b and which comprises two stretchable electroconductive electrodes or layers 24, 28 and which are separated by a dielectric layer 26. The electroconductive layers 24, 28 form electrodes and are connected to the terminals of the coil 22b respectively.

Figure 2:
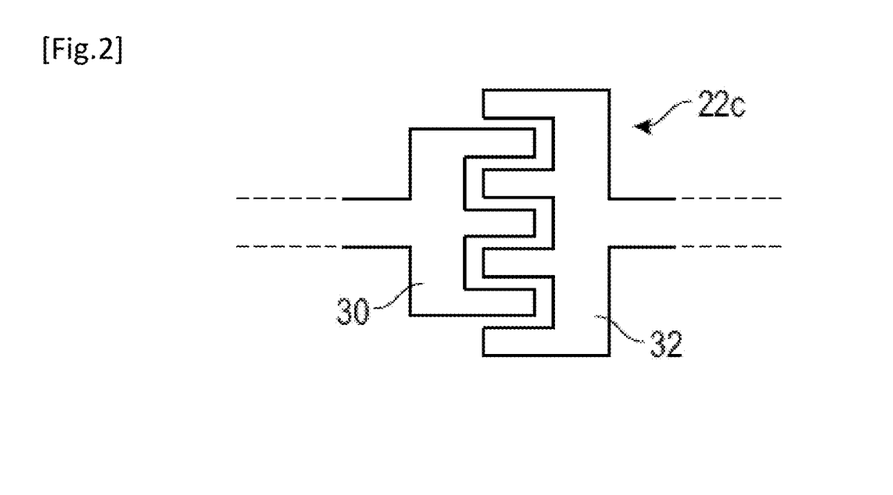
FIG. 2 is a very schematic view of an example of an embodiment of interleaved electrodes for a variable electrical capacitor of an RLC circuit for a pressure sensor according to the invention.

According to another configuration visible in FIG. 2, the capacitor 22c comprises two planar and stretchable electrodes 30, 32 located on the face 20b and interleaved or interdigitated one in the other, these electrodes being connected respectively to the terminals of said first coil 22b.

In each of these configurations, the capacitor 22c is preferably protected by a passivation layer deposited on the capacitor 22c and at least a part of the face 20b.

The coil 22b preferably has an annular or cylindrical shape and extends around an axis A which is preferably centred on the membrane 20. In other words, the coil 22b and the membrane 20 are coaxial.

Furthermore, the coil 22b preferably has an outer diameter smaller than the outer diameter or maximum transverse dimension of the membrane 20.

As can be seen in FIG. 1, the coil 22b may be located on top of the membrane 20 but could also be located on the membrane 20 and in particular its face 20b. The readout circuit 23 comprises a further coil 23b which is preferably located opposite the first coil 22b and configured to detect the resonant frequency of the resonant circuit 22 and output a readout signal accordingly.

The coil 23b preferably has an annular or cylindrical shape and extends around the axis A. It is therefore preferably centred on the coil 22b and the membrane 20.

Furthermore, the coil 23b preferably has an outer diameter which is smaller than the outer diameter or maximum transverse dimension of the membrane 20, and which is preferably identical to the outer diameter of the coil 22b.

Figure 3:
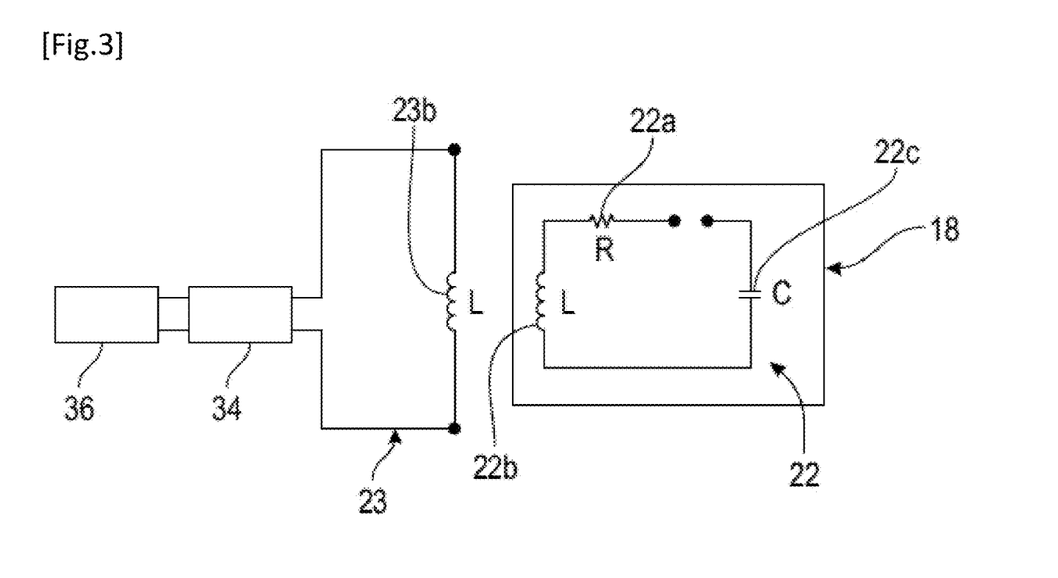
FIG. 3 shows a resonant circuit and a readout circuit of a pressure sensor according to the invention.

The coil 23b is located above the coil 22b and its terminals are connected to an electronic control device which comprises a first module 34 configured to adjust the impedance of the reader antenna (i.e., the coil 23b) and a second module 36 which is configured to follow the variation of the resonant frequency of the circuit 22, as shown in FIGS. 1 and 3.

The module 34 allows the impedance of the reader antenna to be matched so that all the energy sent is transmitted (i.e., minimising the reflection). This module 34 can be composed of capacitor(s) and inductor(s) connected in series or parallel as required.

The module 36 is a frequency vector analyser. It performs a frequency sweep over a given range, which allows the evolution of the resonant frequency of the circuit to be followed.

The pressure sensor 10 according to the invention works as follows. Under the effect of the deformation of the membrane 20 linked to the pressure of the fluid, the value of the capacitance of the capacitor 22c varies, thus causing a change in the resonant frequency of the resonant circuit 22. The offset in this resonant frequency is proportional to the pressure exerted by the fluid.

In practice, a calibration of the pressure sensor 10 may be required to determine the transformation function of the change in pressure with respect to the frequency offset.

FIGS. 4 to 11 show more concrete embodiments of a pressure sensor 10 according to the invention.

Figure 4:
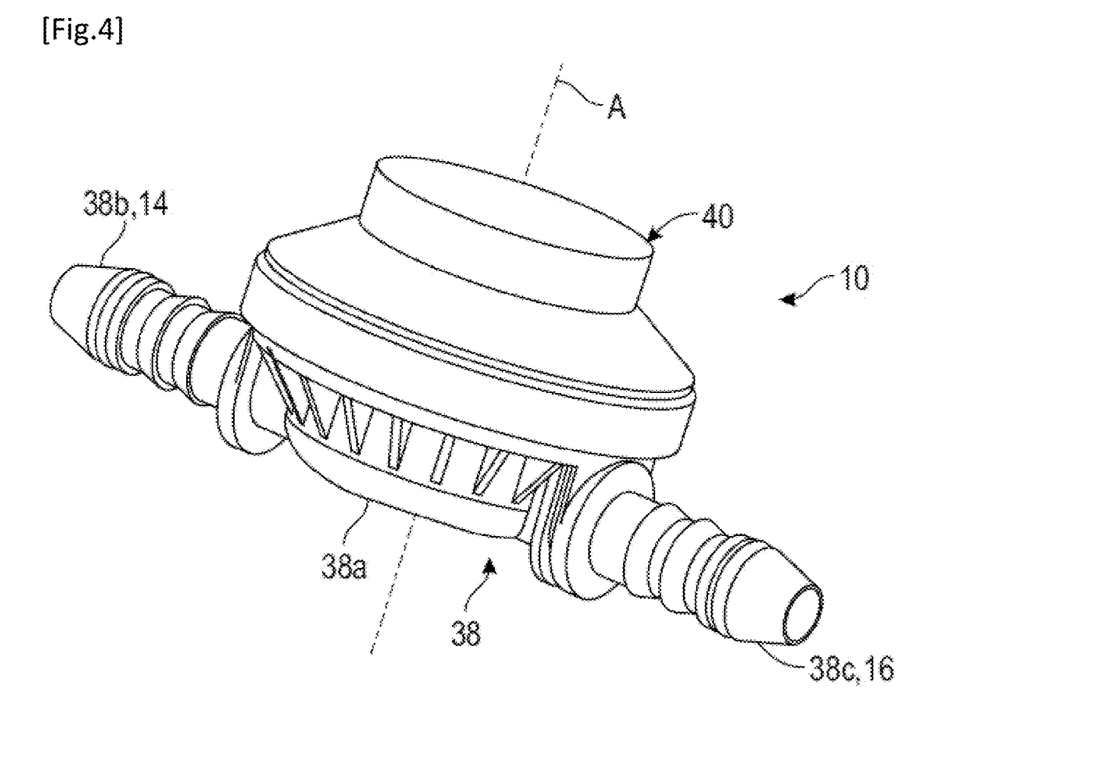
FIG. 4 is a schematic perspective view of an embodiment of a pressure sensor according to the invention.
Figure 5:
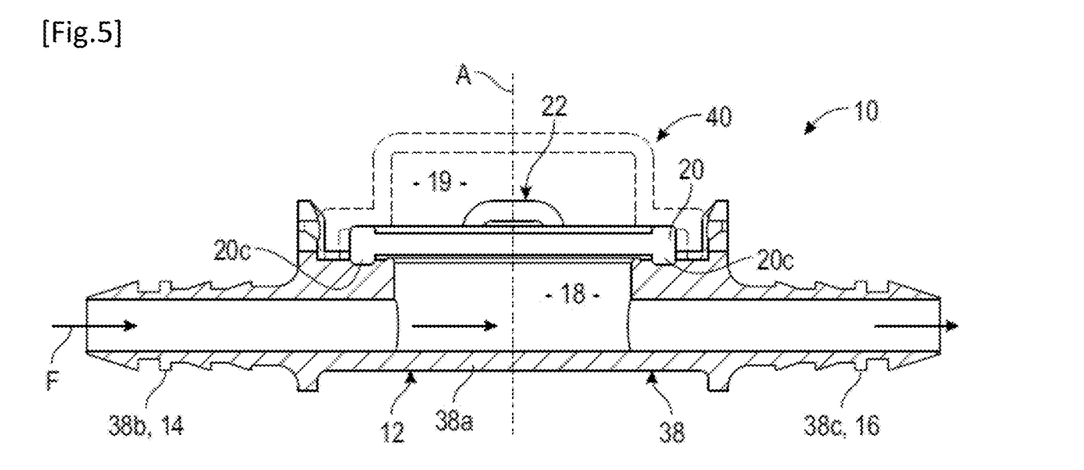
FIG. 5 is a schematic axial cross-sectional view of the pressure sensor of FIG. 4.

In the embodiment shown in FIGS. 4 and 5, the body 12 of the sensor 10 comprises a one-piece casing 38 comprising a central part 38a defining the chamber 18, and two extensions 38b, 38c forming the inlet 14 and outlet 16 respectively.

The central part 38a of the casing 38 has a generally cylindrical shape with an axis A and the extensions 38b, 38c are diametrically opposed with respect to this axis A.

The body 12 further comprises a lid 40 attached and fixed to the central part 38a and defining the space 19 in which the resonant circuit 22 is located.

The membrane 20 separates the chamber 18 from the space 19 and its outer periphery is clamped between the lid 40 and the central part 38a. The membrane 20 then provides a seal between the chamber 18 and the space 19. The outer periphery of the membrane 20 may comprise an annular over thickness 20c intended to be axially compressed so as to ensure a seal up to a sufficient pressure well in excess of the maximum pressure that can be achieved by the fluid flowing through the chamber 18.

The membrane 20 preferably has a generally planar, and for example disc-like, shape and may have an outer diameter or transverse dimension of between 10 and 50 mm, and preferably between 20 and 40 mm. Alternatively, it could have another shape.

It has a minimum thickness of between 1 and 3 mm and a maximum thickness at its outer periphery of between 3 and 8 mm, and preferably between 4 and 7 mm.

Figure 6:
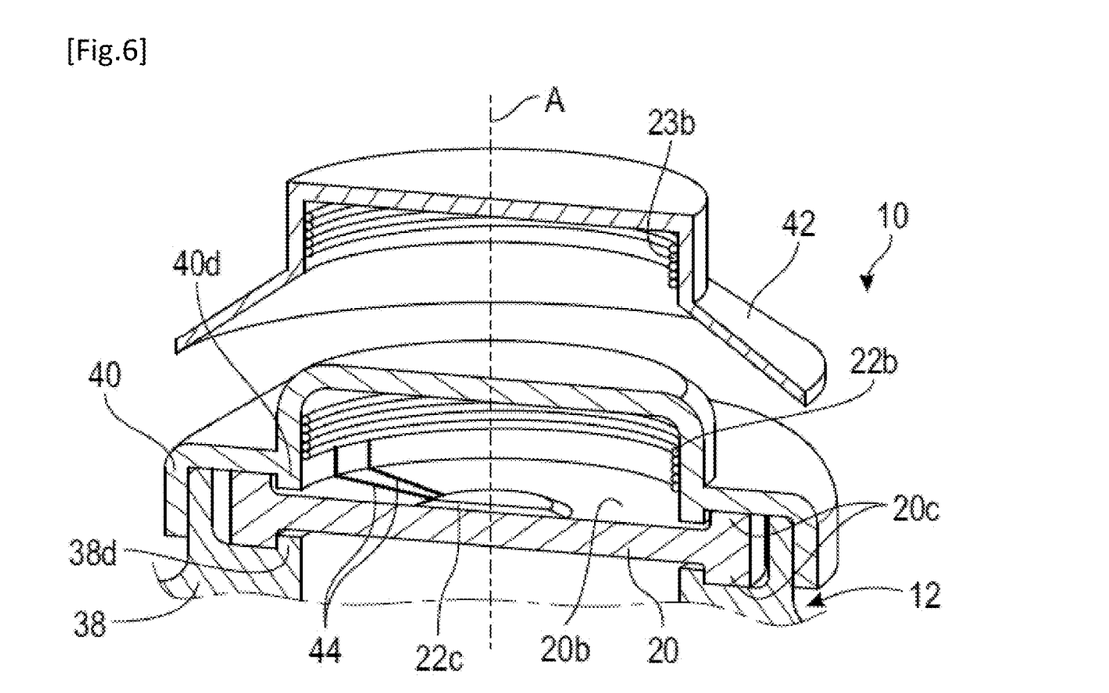
FIG. 6 is a partial schematic perspective and cross-sectional view of an alternative embodiment of a pressure sensor according to the invention.
Figure 7:
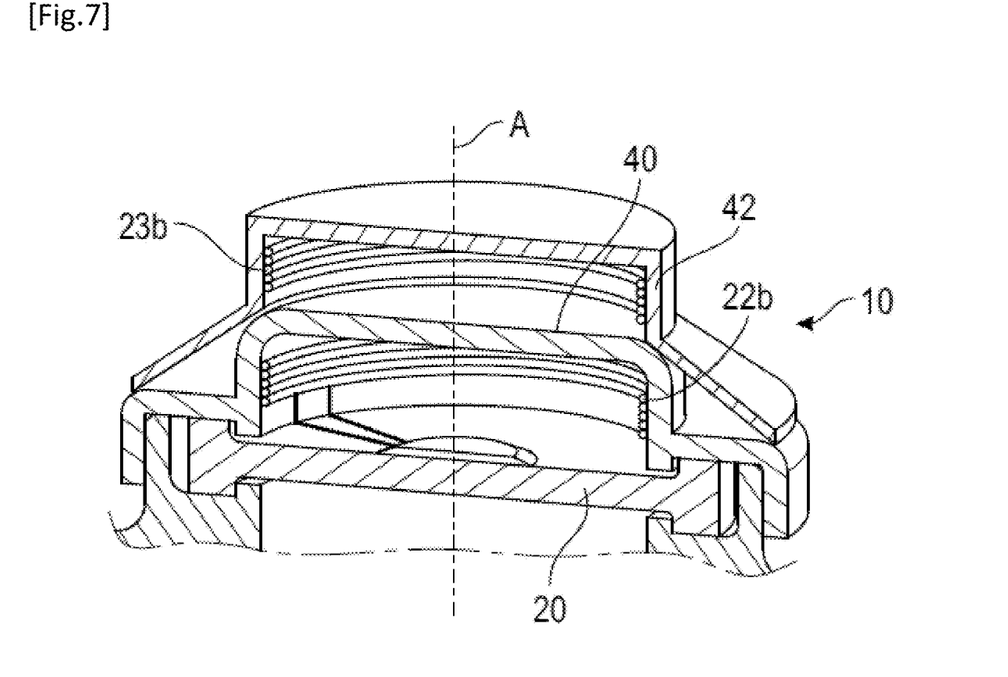
FIG. 7 is a partial schematic perspective and cross-sectional view of an alternative embodiment of a pressure sensor according to the invention.
Figure 8:
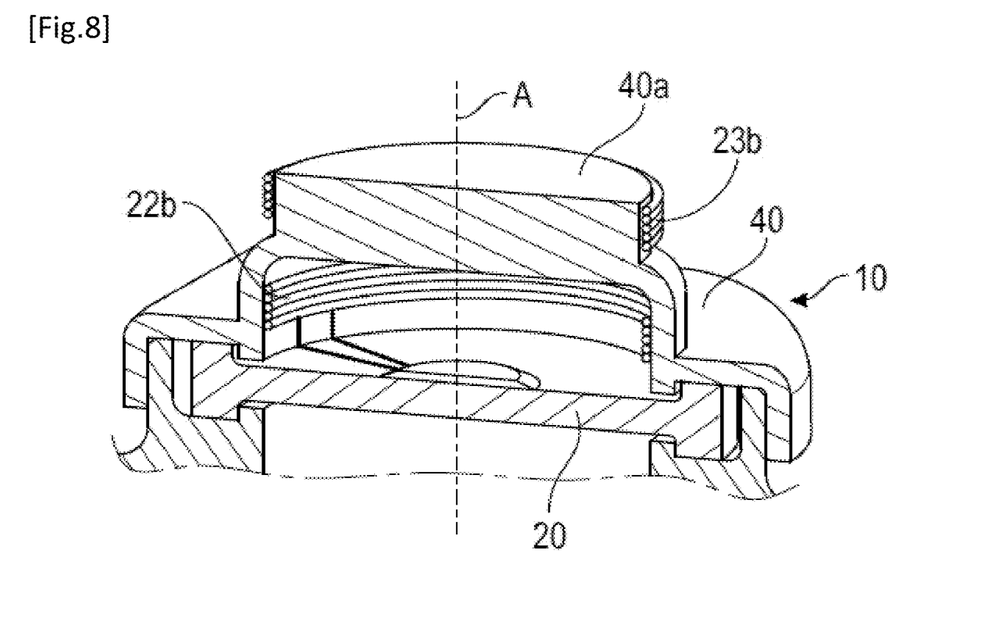
FIG. 8 is a partial schematic perspective and cross-sectional view of an alternative embodiment of a pressure sensor according to the invention.

FIGS. 6 to 8 illustrate alternative embodiments of the pressure sensor 10.

In FIG. 6, the coil 23b of the readout circuit is carried by a cover 42 which is arranged above the lid 40 and at a distance from the latter. The coil 23b is housed in a recess in this cover and thus protected by the cover.

The coil 22b of the resonant circuit 22 is arranged above the membrane 20 and is supported by the lid 40 of the body 12 of the sensor 10. Wires 44 connect the terminals of the coil 22b to the capacitor 22c located on the face 20b of the membrane 20.

In the following, the term "annular" may refer to a generally disc-shaped element or portion of the membrane. In the event that the membrane is not exactly such a shape, "annular" should be interpreted as "peripheral" for example.

The annular over thickness 20c of the membrane 20 is interposed between the lid 40 and the casing 38 of the body 12. The casing 38 and the lid 40 comprise cylindrical rims 38d, 40d which extend around the axis A, facing each other, and between which the membrane 20 is interposed.

The alternative embodiment in FIG. 7 differs from that in FIG. 5 in that the cover 42 is fitted directly and can be fixed to the lid 40. There is therefore no distance or clearance between the cover 42 and the lid 40.

The alternative embodiment shown in FIG. 8 differs from those shown in FIGS. 5 and 6 in that it does not comprise a cover. The coil 23b is carried by the lid 40 and in the example shown extends around a cylindrical extension 40a of the lid 40 along the axis A.

Figure 9:
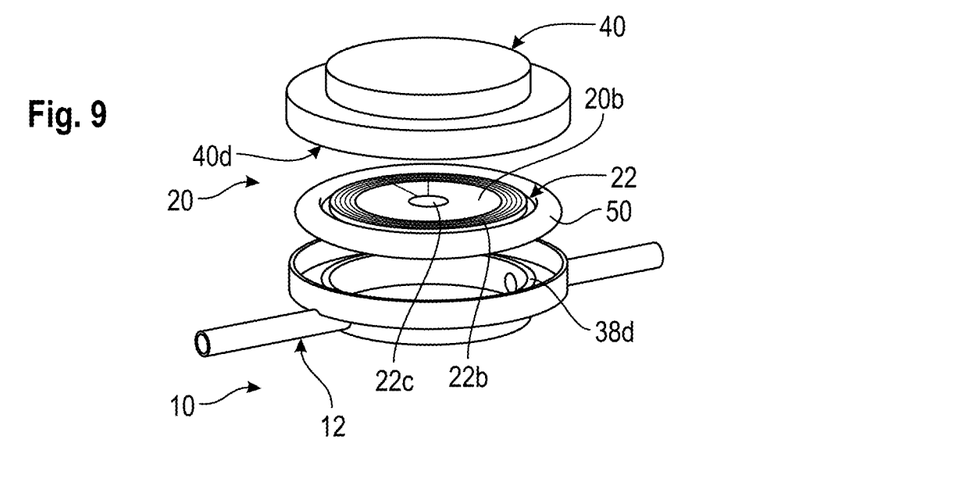
FIG. 9 is a schematic exploded perspective view of another embodiment of a pressure sensor according to the invention.
Figure 10:
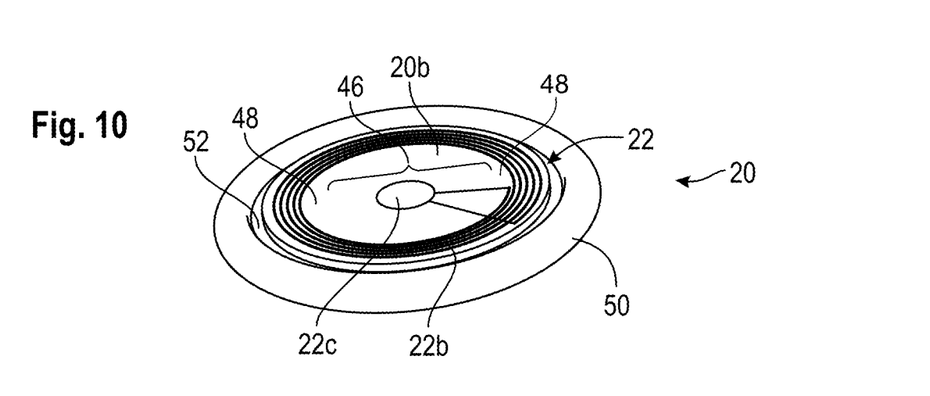
FIG. 10 is a schematic perspective view of a membrane of the sensor of FIG. 9.
Figure 11:
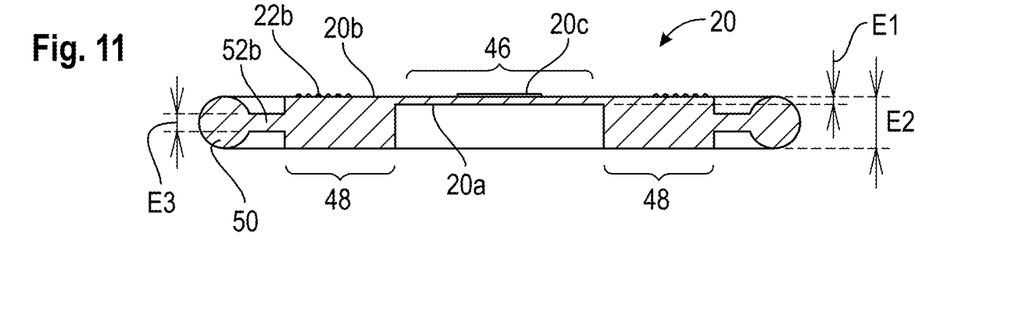
FIG. 11 is a cross-sectional view along line IX-IX of FIG. 9.

Reference is now made to FIGS. 9 to 11 which illustrate another alternative embodiment of a pressure sensor 10 according to the invention.

This alternative embodiment differs from the previous embodiments essentially by its membrane 20 and its resonant circuit 22.

The entirety of the resonant circuit 22 is located on the face 20b of the membrane 20. The capacitor 22c of the resonant circuit 22 is located on a central part 46 of the membrane 20, and the coil 22b is located on an annular part 48 of the membrane 20 extending around the central part 46.

The central part 46 of the membrane 20 has a constant thickness E1 and the annular part 48 has a constant thickness E2 which is greater than E1, and which is for example at least three times or even five times greater than E1. E2 is preferably at most ten times greater than E1.

The membrane 20 further comprises an annular bead 50 at its outer periphery which is connected to the annular part 48 of the membrane 20 by an annular web 52 of material of thickness E3. E3 is between E1 and E2.

As can be seen in FIG. 9, this web 52 is interposed between the two aforementioned cylindrical rims 38d (the rim 40d of the lid 40 is not visible) of the casing 38 and the lid 40, respectively.

FIGS. 12 to 15 illustrate another embodiment of the sensor 110 according to the invention which is here intended to equip a sealed enclosure of the battery pack type.

Figure 12:
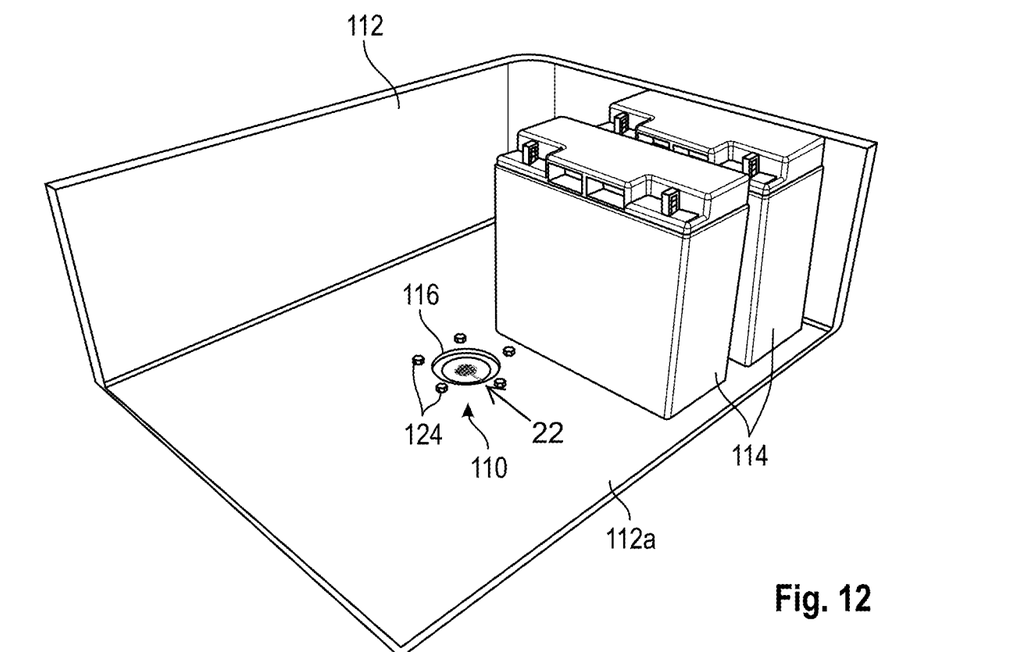
FIG. 12 is a partial schematic perspective view of a sealed enclosure of the battery pack type, equipped with another variant of the sensor according to the invention.
Figure 13:
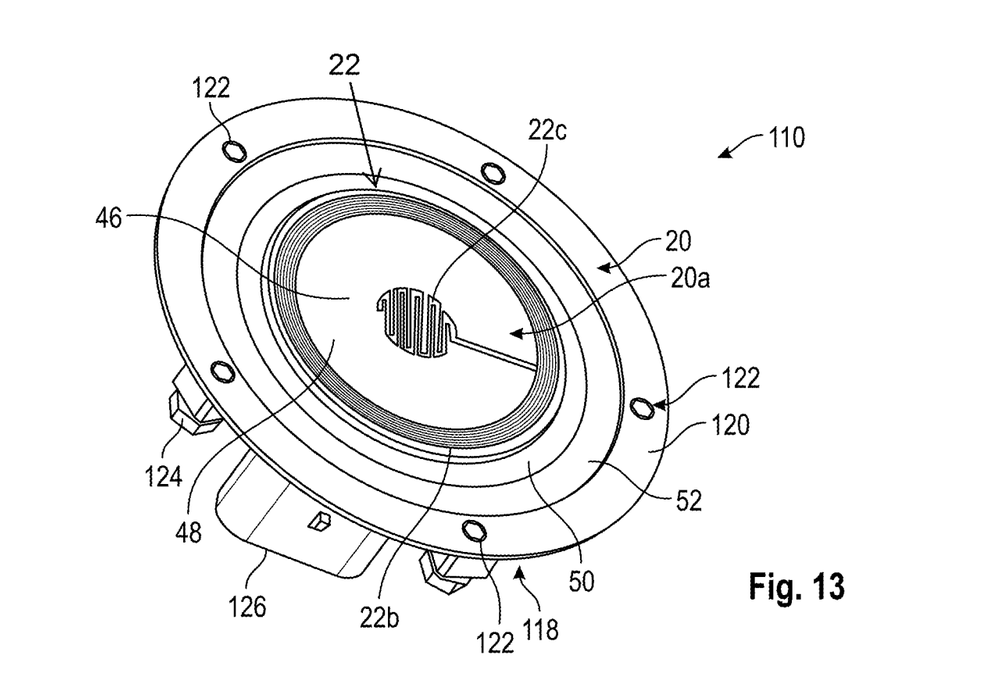
FIG. 13 is a schematic perspective view of the sensor of FIG. 12.
Figure 14:
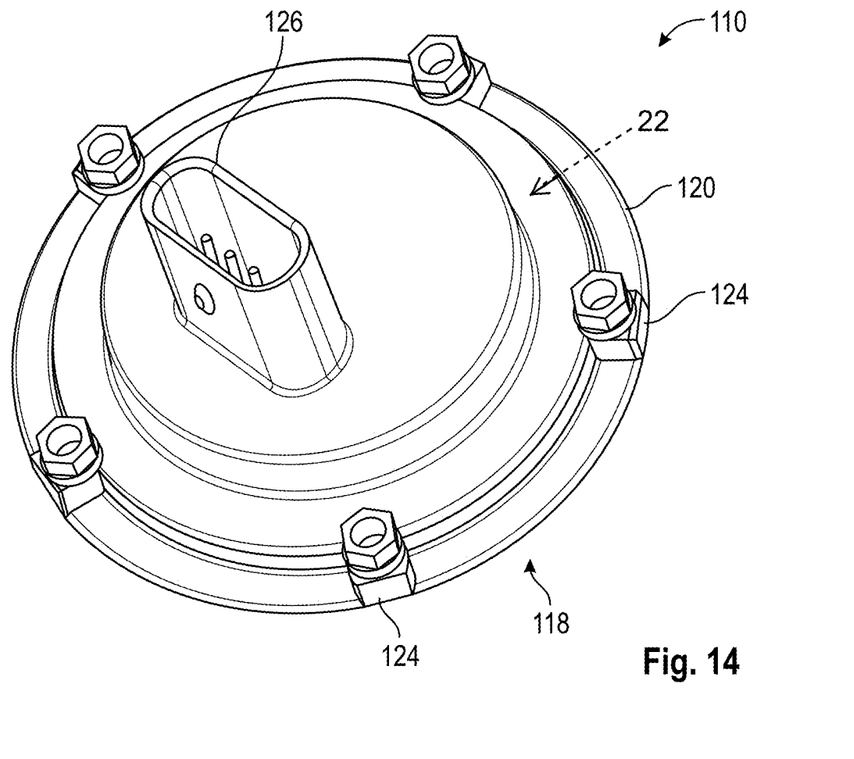
FIG. 14 is another schematic perspective view of the sensor of FIG. 12.
Figure 15:
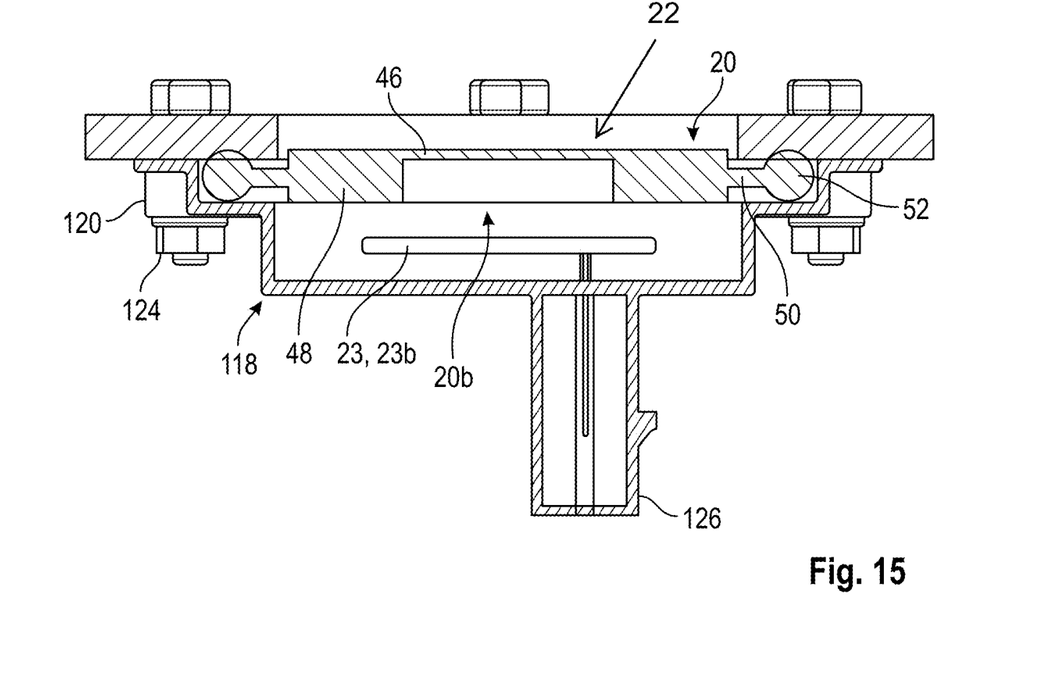
FIG. 15 is a schematic axial cross-sectional view of the sensor of FIG. 12.

The enclosure or battery pack is partially shown in FIG. 12 and comprises a box 112 in which are housed battery cells 114 of which only two are shown for clarity.

The battery cells 114 are enclosed in the box 112 which is sealed. If at least one of the cells 114 malfunctions, it can heat up and produce a gas inside the box 112. Due to the sealed nature of the enclosure, this gas will increase the internal pressure of the enclosure and the pressure sensor 110 is designed to detect this pressure rise and thus detect the malfunction of the cell.

The box 112 comprises a wall 112a comprising a through hole 116 at which the sensor 110 is mounted. In the example shown, the hole 116 and the sensor 110 are located substantially in the middle of this wall 112a. The sensor 110 is attached from the outside onto the hole 116 so as to seal it.

The sensor 110 is similar to that described above in that it comprises a membrane 20 equipped with a resonant circuit 22. However, unlike the sensor 10, the resonant circuit 22 of the sensor 110 is here located on the face 20a intended to be exposed to the fluid (gas) and thus located on the side of the interior of the enclosure.

The sensor 110 is fixed by suitable fastening means to the wall 112a.

The sensor 110 here comprises a body 118 which comprises an external annular fastening flange 120. This flange 120 extends around the membrane 20 and comprises orifices 122 aligned with orifices in the wall 112a for the passage of fastening elements 124 of the screw-nut type.

The body 118 defines with the face 20b of the membrane 20, opposite the face 20a, a space for housing the readout circuit 23.

The body 118 comprises here an electrical plug-in connection 126 which allows the electrical connection of the readout circuit 23 to the electronic control device and in particular to the module(s) 34, 36.

The material of the membrane 20 is preferably an elastomer and is for example HNBR.

The membrane 20 may have one or more of the following characteristics:
- a tensile strength of between 10 and 40 MPa,
- an IRHD hardness of between 50 and 100 pts,
- an elongation at break of between 100 and 600%, and preferably between 200 and 500%.

The invention claimed is:

1. A pressure sensor for a fluid circuit or a sealed enclosure, in particular of a motor vehicle, the sensor comprising:
   an elastically deformable membrane comprising two opposite faces, one of which is intended to be in contact with a fluid,
   a resonant circuit of the RLC type comprising a capacitor which is located on one of the faces of the membrane, and whose capacitance varies as a function of the amplitude of elastic deformation of said membrane, and a first coil which is connected to said capacitor, said resonant circuit being configured to have a resonant frequency which varies as a function of the capacitance of the capacitor and therefore of the elastic deformation of the membrane, and
   a readout circuit offset from the membrane and comprising a second coil located opposite the first coil and configured to detect the resonant frequency of said resonant circuit and to emit a readout signal accordingly,
   wherein the capacitor comprises two electrodes which are connected respectively to the terminals of said first coil and which are both located on the face of the membrane so that they both follow the elastic deformation of the membrane, and in that said first coil is located on or above that face of the membrane, and wherein the first and second coils comprise a common winding axis.

2. The sensor according to claim 1, wherein the capacitor comprises a sandwich structure located on said face of the membrane and comprising two stretchable electroconductive layers separated by a dielectric layer, these electroconductive layers forming said electrodes.

3. The sensor of claim 1, wherein said electrodes are planar, stretchable on said face of the membrane, and interleaved with each other.

4. The sensor according to claim 1, wherein the sensor further comprises a body in which the membrane is mounted.

5. The sensor according to claim 4, wherein the body comprises an outer annular or peripheral fastening flange, which flange extends around said membrane and comprises orifices for the passage of fastening elements.

6. The sensor according to claim 5, wherein the membrane has its outer periphery clamped by the fastening flange or between the lid and the central part, so that this membrane provides a seal.

7. The sensor according to claim 4, wherein the body comprises a fluid inlet, a fluid outlet, and an internal chamber for connecting the inlet to the fluid outlet for the fluid flow in said body, said readout circuit being located outside the chamber and being separated from that chamber by said membrane.

8. The sensor according to claim 7, wherein the body comprises a one-piece casing comprising a central part defining said chamber, and two extensions forming said inlet and outlet respectively.

9. The sensor according to claim 8, wherein the body further comprises a lid attached and fixed to the central part and defining with the membrane a space for housing said readout circuit.

10. The sensor according to claim 9, wherein the second coil is located in the body, on the lid, or is carried by a cover located above the lid.

11. The sensor according to claim 1, wherein the entirety of the resonant circuit is located on said face of the membrane, the capacitor of the resonant circuit being located on a central part of the membrane and the first coil being located on an annular or peripheral part of the membrane extending around the abovementioned central part.

12. The sensor according to claim 11, wherein the membrane further comprises an annular or peripheral bead at its outer periphery which is connected to the annular or peripheral part of the membrane by an annular or peripheral web of material of thickness E3, E3 being between E1 and E2.

13. The sensor according to claim 1, wherein the central part of the membrane has a constant thickness E1 and the annular or peripheral part of the membrane has a constant thickness E2 which is greater than E1, and which is for example at least three times greater than E1 and at most ten times greater than E1.

14. The sensor according to claim 1, wherein the second coil is connected to an electronic control device which comprises a first module configured to adjust an impedance of the RLC circuit and a second module which is configured to analyse a vector frequency.

15. A fluid circuit, in particular for a motor vehicle, comprising at least one sensor according to claim 1.

16. A sealed enclosure such as a battery pack, in particular for a motor vehicle, comprising at least one sensor according to claim 1.

17. A vehicle, in particular an automobile, comprising at least one sensor according to claim 1.

18. A pressure sensor for a fluid circuit or a sealed enclosure, in particular of a motor vehicle, the sensor comprising:
an elastically deformable membrane comprising two opposite faces, one of which is intended to be in contact with a fluid,
a resonant circuit of the RLC type comprising a capacitor which is located on one of the faces of the membrane, and whose capacitance varies as a function of the amplitude of elastic deformation of said membrane, and a first coil which is connected to said capacitor, said resonant circuit being configured to have a resonant frequency which varies as a function of the capacitance of the capacitor and therefore of the elastic deformation of the membrane, and
a readout circuit offset from the membrane and comprising a second coil located opposite the first coil and configured to detect the resonant frequency of said resonant circuit and to emit a readout signal accordingly,
wherein the capacitor comprises two electrodes which are connected respectively to the terminals of said first coil and which are both located on the face of the membrane so that they both follow the elastic deformation of the membrane, and in that said first coil is located on or above that face of the membrane,
wherein the sensor further comprises a body in which the membrane is mounted,
wherein the body comprises a fluid inlet, a fluid outlet, and an internal chamber for connecting the inlet to the fluid outlet for the fluid flow in said body, said readout circuit being located outside the chamber and being separated from that chamber by said membrane,
wherein the body comprises a one-piece casing comprising a central part defining said chamber, and two extensions forming said inlet and outlet respectively,
wherein the body further comprises a lid attached and fixed to the central part and defining with the membrane a space for housing said readout circuit, and
wherein the second coil is located in the body, on the lid, or is carried by a cover located above the lid.

19. A pressure sensor for a fluid circuit or a sealed enclosure, in particular of a motor vehicle, the sensor comprising:
an elastically deformable membrane comprising two opposite faces, one of which is intended to be in contact with a fluid,
a resonant circuit of the RLC type comprising a capacitor which is located on one of the faces of the membrane, and whose capacitance varies as a function of the amplitude of elastic deformation of said membrane, and a first coil which is connected to said capacitor, said resonant circuit being configured to have a resonant frequency which varies as a function of the capacitance of the capacitor and therefore of the elastic deformation of the membrane, and
a readout circuit offset from the membrane and comprising a second coil located opposite the first coil and configured to detect the resonant frequency of said resonant circuit and to emit a readout signal accordingly,
wherein the capacitor comprises two electrodes which are connected respectively to the terminals of said first coil and which are both located on the face of the membrane so that they both follow the elastic deformation of the membrane, and in that said first coil is located on or above that face of the membrane,
wherein the sensor further comprises a body in which the membrane is mounted,
wherein the body comprises an outer annular or peripheral fastening flange, which flange extends around said membrane and comprises orifices for the passage of fastening elements, and
wherein the membrane has its outer periphery clamped by the fastening flange or between the lid and the central part, so that this membrane provides a seal.

* * * * *